A. T. BUTTON & W. P. WIDDIFIELD.
SEEDING APPARATUS.
APPLICATION FILED JULY 7, 1913.

1,081,720. Patented Dec. 16, 1913.
2 SHEETS—SHEET 2.

WITNESSES:
N. R. Tyndall.
E. P. Hall.

INVENTORS.
A. J. Button.
W. P. Widdifield
BY J. Edward Maybee.
ATTY.

UNITED STATES PATENT OFFICE.

ANSON T. BUTTON AND WATSON P. WIDDIFIELD, OF UXBRIDGE, ONTARIO, CANADA.

SEEDING APPARATUS.

1,081,720.

Specification of Letters Patent.

Patented Dec. 16, 1913.

Application filed July 7, 1913. Serial No. 777,721.

*To all whom it may concern:*

Be it known that we, ANSON T. BUTTON and WATSON P. WIDDIFIELD, of the town of Uxbridge, in the Province of Ontario, Canada, have invented certain new and useful Improvements in Seeding Apparatus, of which the following is a specification.

This invention relates to apparatus intended particularly for use in sowing grain in drills and our object is to devise apparatus which will sow the grain in drills under conditions as nearly ideally perfect as possible.

It has been found experimentally that grain should be sown in drills of even depth throughout and evenly covered with soil, and that preferably the soil in which the grain is sown should be well compacted, and that the seed should be more or less spread out rather than concentrated in the bottom of a wedge shape drill. We obtain the desired conditions by means of apparatus which may be briefly described as follows:—

A suitable frame work carries a rotary drum provided with circumferential ribs. These ribs are adapted to form drills or depressions in the soil with flat bottoms, which drills will necessarily be of even depth. The surface of the soil after the usual preparation is, immediately before the seed is sown, stirred up by a suitable harrow, which preferably is connected with the frame work of the apparatus in front of the drum hereinbefore referred to. Suitably connected with the apparatus so as to discharge seed into the drills immediately behind the drum is an ordinary seed distributing device. Also connected with the frame work of the apparatus is a suitable device for covering in the drills. Immediately after covering, the soil is lightly stirred with a suitable harrow to leave its surface in the best possible condition to avoid evaporation of moisture and to prevent its being blown up in dust. This harrow is also preferably connected with the frame work of the apparatus instead of being used as a separate implement. The whole is arranged in detail substantially as hereafter described and illustrated in the accompanying drawings in which—

Figure 1:
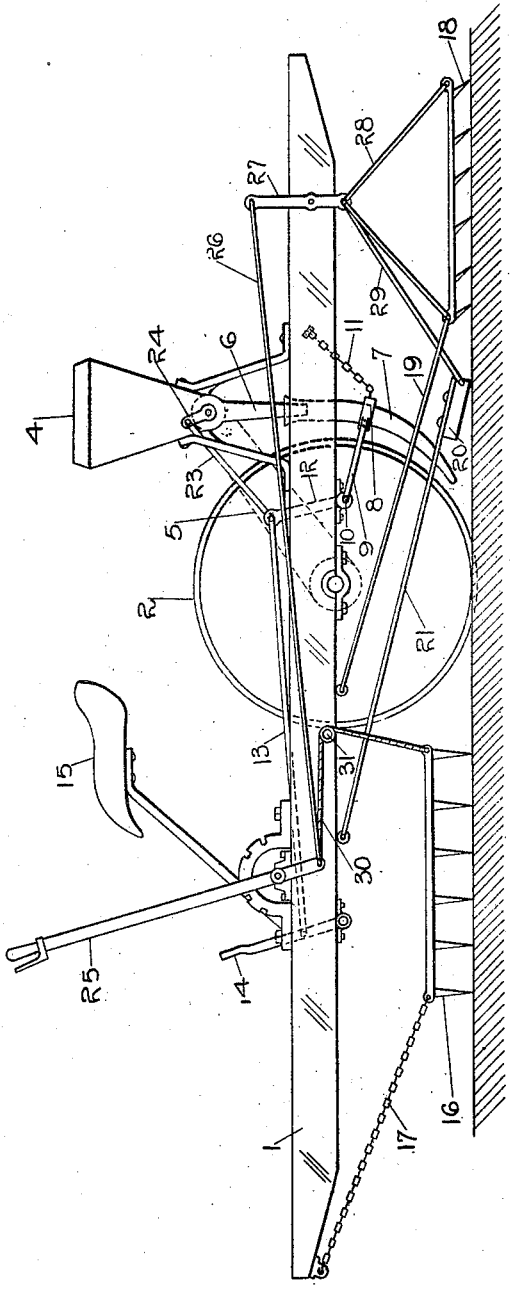
Figure 2:
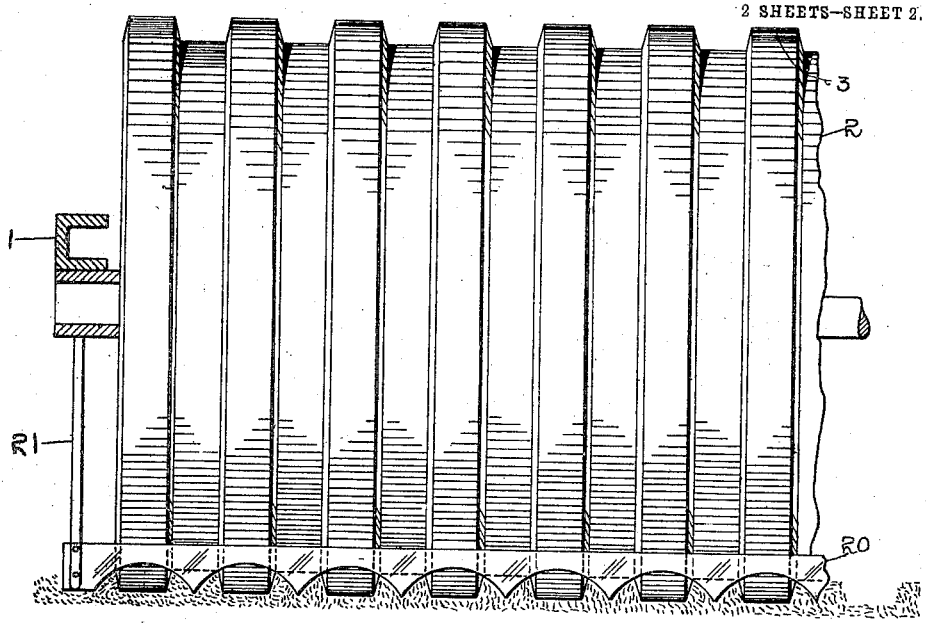
Figure 3:
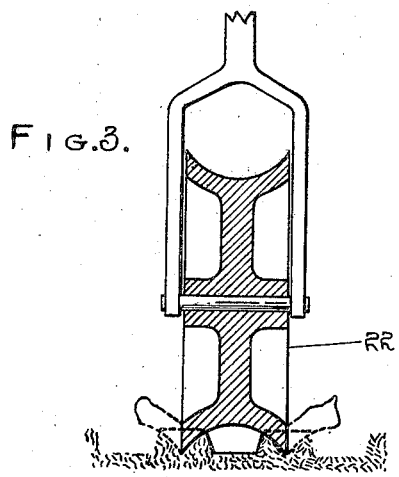

Figure 1 is a side elevation of our improved apparatus, Fig. 2 a rear view of the drum and covering device, Fig. 3 a detail showing a modified form of covering device.

In the drawings like numerals of reference represent corresponding parts in the different figures.

Referring particularly to Fig. 1, 1 is the frame of the apparatus suitably constructed to support the different parts. On this frame work is journaled the drum 2. This drum, as will be seen particularly on reference to Fig. 2, is provided with a series of circumferential ribs 3. These ribs with cylindrical faces are spaced to suit the best practice, as determined experimentally, for the proper growth of the grain. The spacing may vary from say 5″ to 7″ center to center. The depth of the ribs may also vary, probably about one and a half inches being the best practice. The ribs are also tapered as shown to produce a drill with sides sloping downwardly and inwardly, as such drills best maintain their form and are more easily formed. The effect of this roller is to even up and compress the whole surface traversed and at the same time to press parallel drills or grooves in the soil with comparatively broad flat bottoms. This forms an ideal drill for seed sowing.

Immediately behind the drum is located the seed hopper 4 of any ordinary construction, the seed feeding devices forming part thereof being actuated by means of the sprocket wheel and chain gearing 5. As the feeding devices are old in the art, they are not shown or described. From the seed hopper the grain is led by the usual spouts 6. Each of these spouts enters a grain tube 7, which is suitably shaped to discharge the grain into the corresponding drill immediately behind the drum 2. In order that these grain tubes may be lifted out of the way when the apparatus is to be turned or transported without sowing the seed, we support the grain tubes so that they may be simultaneously raised. In Fig. 1, the grain tubes are shown connected with a bar 8, which bar is connected to rock arms 9, connected with a shaft 10, journaled on the frame of the apparatus. It is evident that by rocking this shaft the grain tubes may be raised or lowered as may be desired. Suitable means such as chains 11 connected to the bar 8 and the frame of the machine may be employed to limit the downward movement of the grain tubes. The shaft 10 may be rocked to raise the grain tubes by means of the rock arm 12 secured to the shaft and connected by means of the connecting rod 13 with a foot lever 14 suitably located adjacent to the driver's seat 15.

After the seed grain has been deposited in the drills, the drills are covered in. We do not desire to limit ourselves to any specific means for effecting the covering. We may, for example, employ a serrated drag 20, the serrations being preferably formed by semi-circular notches in the edge of the bar. The points of the teeth of the drag correspond with the center lines of the spaces between the drills. This drag is connected with the frame of the apparatus by means of the draft rods 21. Instead of the drag, a roller 22 or series of rollers, such as illustrated in Fig. 3, might be employed. Each roller will span a drill as shown and roll the earth into the same to cover the seed.

As already stated, a preliminary harrowing of the soil is desirable immediately before the drills are compressed therein. For this purpose we provide any suitable form of harrow. A spike tooth harrow 16, such as shown in Fig. 1 is suitable for our purpose. This is connected by means of draft chains 17 with the frame of the apparatus. A light harrowing is, we consider, preferable immediately following the covering in. For this purpose we provide the harrow 18 which is formed with comparatively short rearwardly inclined teeth, and is connected by draft rods or chains 19 with the frame of the apparatus.

For convenience in turning or in transportation it is necessary that means be provided to lift the harrows and drag from the ground and also to cut off the seed feed. The cut-off of the feed may be readily effected by utilizing the movement of the rock arm 12, which may be connected by means of a connecting rod 23, with a rock arm 24, which may be connected with any of the ordinary cut-off devices employed with grain seeders. The harrows and drag may be raised by means of the hand lever 25, suitably pivoted adjacent to the seat 15. The lower end of this lever is connected by means of the connecting rod 26 with a lever 27 fulcrumed intermediate its end on the frame of the apparatus. The lower end of this lever may be connected by means of rods or chains 28 with the harrow 18 and also by means of the rods or chains 29 with the drag 20. A cord or chain 30 connected with the hand lever 25 is passed around the sheave 31 and connected with the rear of the harrow 16. From this connection, it is evident that by rocking the hand lever both the harrows and the drag bar may be simultaneously raised. It will be understood, of course, that we do not desire to limit ourselves to the exact details of construction shown, as this may be varied widely without departing from the spirit of our invention.

With the apparatus as described it will be seen that by means of the harrow 16 the soil is brought into the best possible condition to be operated on by the drum 2. This drum following the harrow compacts and pulverizes the whole surface of the soil and simultaneously forms the drills by further compacting the soil at regular intervals. Into these regular well compacted furrows of even depth the seed is fed, scattering itself well over the relatively wide bottoms of the drills. Thereafter these drills are filled in by the covering device. Owing to the thorough preparation of the soil and the even height of the soil between the drills above the bottom of the drills, the seed will be evenly covered in each drill and at all points in the length of each drill. Thereafter the soil is lightly stirred by the following harrow to leave its surface in the best possible condition to resist the effects of drought or wind.

What we claim as our invention is:—

1. In seeding apparatus the combination of a frame; a roller journaled thereon provided with cylindrical faced circumferential ribs and adapted to press drills in the soil with comparatively broad flat bottoms; and seed distributing means carried by the frame and adapted to feed seed to the drills so formed.

2. In seeding apparatus the combination of a frame; a roller journaled thereon provided with cylindrical faced circumferential ribs and adapted to press drills in the soil with comparatively broad flat bottoms; seed distributing means carried by the frame and adapted to feed seed to the drills so formed; and covering means connected with the frame adapted to fill in the drills.

3. In seeding apparatus the combination of a frame; a harrow provided with cylindrical faced circumferential ribs and connected therewith; a roller journaled on the frame behind the harrow and adapted to press drills in the soil with comparatively broad flat bottoms; and covering means connected with the frame adapted to fill in the drills.

4. In seeding apparatus the combination of a frame; a harrow connected therewith; a circumferentially ribbed roller journaled on the frame behind the harrow and adapted to press drills in the soil; covering means connected with the frame adapted to fill in the drills; and a harrow connected with the frame and adapted to roughen the surface of the soil after the covering in of the drills.

5. In seeding apparatus the combination of a frame; a roller journaled thereon provided with cylindrical faced circumferential ribs and adapted to press drills in the soil;

seed distributing means carried by the frame and adapted to feed seed to the drills so formed; covering means connected with the frame adapted to fill in the drills; and means on the frame for raising the covering means at will.

6. In seeding apparatus the combination of a frame; a harrow provided with cylindrical faced circumferential ribs and connected therewith; a roller journaled on the frame behind the harrow and adapted to press drills in the soil with comparatively broad flat bottoms; covering means connected with the frame adapted to fill in the drills; and means on the frame for simultaneously raising the harrow and covering means at will.

7. In seeding apparatus the combination of a frame; a harrow connected therewith; a circumferentially ribbed roller journaled on the frame behind the harrow and adapted to press drills in the soil; covering means connected with the frame adapted to fill in the drills; a harrow connected with the frame and adapted to roughen the surface of the soil after the covering in of the drills; and means on the frame for simultaneously raising the harrows and covering means at will.

Toronto this 2nd day of July 1913.

ANSON T. BUTTON.
WATSON P. WIDDIFIELD.

Signed in the presence of—
J. EDW. MAYBEE,
E. P. HALL.

---

Copies of this patent may be obtained for five cents each, by addressing the "Commissioner of Patents, Washington, D. C."